US006496825B1

(12) United States Patent
Klein et al.

(10) Patent No.: US 6,496,825 B1
(45) Date of Patent: *Dec. 17, 2002

(54) SYSTEMS AND METHODS FOR THE DETECTION OF A LOOP-BACK OF A TRANSACTION

(75) Inventors: Johannes Klein, San Francisco, CA (US); Roger J. Hansen, San Francisco, CA (US); Sitaram V. Lanka, Mercer Island, WA (US); Albert C. Gondi, Santa Clara, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/267,460

(22) Filed: Mar. 12, 1999

(51) Int. Cl.[7] ............................ G06F 9/00; G06F 15/16; G06F 17/30
(52) U.S. Cl. ....................... 707/10; 707/104.1; 709/101
(58) Field of Search ................................ 709/106, 227, 709/230–232, 100–105, 202, 203, 219, 223, 226; 707/10, 220, 511, 104.1, 101–104, 1, 9; 714/10–16, 35, 50; 710/48, 49

(56) References Cited

U.S. PATENT DOCUMENTS

| | | | |
|---|---|---|---|
| 4,228,496 A | 10/1980 | Katzman et al. ............. 364/200 |
| 4,817,091 A | 3/1989 | Katzman et al. ................ 371/9 |
| 5,751,932 A | 5/1998 | Horst et al. .............. 395/182.1 |
| 6,105,147 A | 8/2000 | Molloy ......................... 714/16 |
| 6,266,698 B1 * | 7/2001 | Klein et al. ................. 709/227 |
| 6,286,110 B1 | 9/2001 | Klein et al. ..................... 714/2 |
| 6,295,548 B1 * | 9/2001 | Klein et al. .................. 709/101 |
| 6,411,981 B1 | 6/2002 | Klein et al. .................. 709/101 |

OTHER PUBLICATIONS

Jim Gray, et al.; Transaction Processing: Concepts and Technique; Morgan Kauffman; 1993; pp. v–xxxii.

* cited by examiner

Primary Examiner—Safet Metjahic
Assistant Examiner—Te Chen
(74) Attorney, Agent, or Firm—Oppenheimer, Wolff & Donnelly LLP; Leah Sherry

(57) ABSTRACT

Systems and Methods for identifying in the gateway processes or application processes whether an imported transaction is a loop-back transaction, and if so performing work for the imported transaction under the parent transaction. Upon receiving a work request from a remote transaction processing system, an endpoint identifier included as part of the work request is analyzed to determine whether the work request is associated with a parent transaction initiated at the local transaction processing system. If the endpoint identifier indicates that the work request is associated with a transaction initiated in the local transaction processing system, a global transaction identifier included as part of the work request is analyzed to determine the identity of the parent transaction. If the work request includes a remote TIP URL, the application process that receives the request is configured to analyze the global transaction identifier and determine the identity of the parent transaction. If the remote transaction processing system sends a push request, the gateway process that receives the request is configured to analyze the global transaction identifier and determine the identity of the parent transaction. Work is thereafter performed according to the work request under the parent transaction such that a new transaction is not initiated.

20 Claims, 6 Drawing Sheets

Components of a Heterogeneous Transaction Processing System

Components of a Heterogeneous Transaction Processing System

SYSTEMS AND METHODS FOR THE DETECTION OF A LOOP-BACK OF A TRANSACTION

CROSS REFERENCE TO RELATED APPLICATIONS

This Application is related to of U.S. applications Ser. Nos. 09/267,422, 09/267,032, 09/267,844 filed Mar. 12, 1999, Mar. 11, 1999, and Mar. 12, 1999, respectively.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates generally to transaction processing, and more particularly to techniques for identifying whether an imported transaction is associated with a parent transaction that was exported by the same transaction processing system that received the imported transaction.

A transaction is most often defined as an explicitly delimited operation, or set of related operations, that change or otherwise modify the content of an information collection (e.g., database or databases) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection are undone to leave it in a consistent state.

A transaction processing system typically includes a transaction manager (TM); a collection of subsystems, called resource managers (RMs), which are essentially abstractions of available services, such as database systems; application programs; and the like. The transaction processing system provides a way to interconnect applications and resource managers while maintaining data integrity and transactional consistency.

The application process initiating a transaction invokes various services and/or resource managers to perform various operations and tasks necessary to complete the transaction. All services and resource managers invoked to perform operations for the transaction register with a transaction manager, stating that they are joining the transaction. A transaction manager typically provides transaction management functions, such as monitoring the progress of the transaction and coordinating the commit processing and rollback of the transaction, and protects the integrity of user data. When all operations, or work, have completed, the initiating application process notifies the transaction manager of this fact. The transaction manager then initiates an agreement protocol to coordinate commitment processing among all services and resource managers (including foreign transaction managers) participating in the transaction. In transaction processing the standard agreement protocol is the two-phase commitment (2PC) protocol. A description of the 2PC protocol, as well as a detailed overview of transaction processing, is presented in J. Gray et al., *Transaction Processing Concepts and Techniques,* Morgan Kauffman, 1993, the contents of which are herein incorporated by reference.

Briefly, in phase one of the 2PC protocol, the transaction manager issues a request prepare signal to each participant (i.e., the transaction manager asks each participating service or resource manager if it believes the operations it performed to be a consistent and complete transformation). If any participant votes no, the commit fails and the transaction is aborted and rolled back; if all participating resource managers vote yes (ready to commit), the transaction is a correct transformation and phase two commences. In phase two of the 2PC protocol, the transaction manager issues a commit request signal informing each participant that the transaction is complete, and records this fact in the transaction's log. After all participants acknowledge the commit request, the transaction manager records this fact and forgets about the transaction.

Recently, a Transaction Internet Protocol (TIP) that uses the 2PC paradigm has been proposed by the Internet Engineering Task Force (IETF). Attached hereto, as Appendix A, is the final version of the IETF paper describing TIP and its requirements. The IETF paper describes a simple 2PC protocol applicable to transactions involving resources in a distributed, Internet-connected transaction. Basically, two models are described: a "Push" model and "Pull" model.

In the Push model, an application on a first transaction processing system requests that the transaction manager of that system "export" a transaction, T1, to a second transaction processing system to perform some work on behalf of the application. The transaction manager of the first system "pushes" transaction T1 to the second system by sending a message to the transaction manager of the second system. The message requests that the second system start a local transaction associated with transaction T1 as a subordinate of the first system, and return the name, for example "LT1", for that local transaction branch on the second system together with the Internet address of the local transaction branch. The transaction manager forwards to the application the name, LT1, and the internet address of the transaction on the second system associated with transaction T1. The application then sends a message to the desired application on the second system, asking it to "do some work, and make it part of the transaction that your transaction manager already knows of by the name of LT1." Additionally, the first and second transaction managers each update a global map by associating the global transaction T1 initiated on the first system with the exported transaction branch LT1. The global map is a data structure that is typically maintained by each transaction manager in order to associate any and all remote transaction branches, such as LT1, with associated global transactions, such as T1. Because the first system's transaction manager knows that it sent the transaction to the second system's transaction manager, the first system's transaction manager knows to involve the second system's transaction manager in the 2PC process.

In the Pull model, an application on the first system merely sends a message to an application on the second system, requesting that it "do some work, and make it part of a transaction that my transaction manager knows by the name of T1." The application on the second system then requests that its transaction manager enlist in the transaction T1. The second system's transaction manager "pulls" transaction T1 over from the first system and initiates a local transaction, LT1, associated with transaction T1. Also, both transaction managers each update their system's global map. As a result of the pull, the first system's transaction manager knows to involve the second system's transaction manager in the 2PC process.

In both the pull and push models, a resource on the second transaction processing system may "loop back" a transaction by exporting transaction LT1 to the first transaction processing system to perform work on behalf of transaction LT1. For example, a resource on the second transaction system may send a pull request message to a second application on the first transaction processing system requesting that the second application "do some work, and make it part of a transaction that my transaction manager knows by the name LT1." The second application then requests that its transaction manager enlist in the transaction LT1. The first system's transaction manager will check its data structure, for example its global map, and will see that transaction LT1 is associated with transaction T1, which was initiated locally on the first transaction processing system. Rather than pulling the transaction LT1 over from the second system, the first system's transaction manager will return transaction T1 to the second application, so that the second application performs the requested work under transaction T1. Similarly, if a push request is sent from the second system to the first system's transaction manager, the first system's transaction manager will perform the lookup and will see that transaction LT1 is associated with transaction T1. The first system's transaction manager will then initiate the work at the second application under transaction T1, and respond to the second system by issuing an appropriate response, such as an "already pushed" response. In both examples of a loop-back transaction described above, the first system's transaction manager performs a lookup to determine whether the imported transaction is associated with a parent transaction exported by the first system.

SUMMARY OF THE INVENTION

The present invention provides systems and methods for identifying whether a transaction imported to the local transaction processing system from a remote transaction processing system is subordinate to a parent transaction initiated by the local transaction processing system (i.g., a loop-back transaction). In particular, the present invention provides techniques for identifying in the gateway processes or application processes whether an imported transaction is a loop-back transaction, and if so performing work for the imported transaction under the parent transaction.

According to the invention, upon receiving a work request from a remote transaction processing system, an endpoint identifier included as part of the remote transaction identifier is analyzed to determine whether a parent transaction was initiated at the local transaction processing system. If the endpoint identifier indicates that the transaction was initiated in the local transaction processing system, the transaction identifier is analyzed to determine the identity of the parent transaction. Pull requests are typically sent directly to the desired application process by the remote transaction processing system and push requests are typically sent to the local transaction manager through a gateway process. In the pull case, the application process that receives the request is configured to analyze the global transaction identifier and determine the identity of the parent transaction, and in the push case, the gateway process that receives the request is configured to analyze the global transaction identifier and determine the identity of the parent transaction. Work is thereafter performed according to the work request under the parent transaction such that a new transaction is not initiated.

According to an aspect of the invention, a method is provided for detecting a loop back of a transaction in a transaction processing system having a transaction manager (TM) and an application process. The method typically comprises the steps of creating a local transaction in the transaction processing system by the TM, the local transaction having an associated first transaction identifier (TXID); performing work for the local transaction by the application process; sending a first work request associated with the local transaction to a remote transaction processing node; wherein the first work request includes a global transaction identifier (G1) associated with the local transaction, and wherein G1 encodes the first TXID; and receiving a second work request associated with a remote transaction from the remote transaction processing node, wherein the remote transaction is subordinate to the local transaction, wherein the second work request includes G1. The method also typically comprises the steps of determining whether G1 is associated with a transaction created by the first transaction processing system; and if so decoding a portion of G1 so as to obtain the first TXID.

According to another aspect of the invention, a transaction processing system is provided that is communicably coupled to one or more remote transaction processing nodes. The system typically comprises a transaction manager (TM), wherein the TM creates a local transaction having an associated first transaction identifier (TXID), and wherein the local transaction is exported to a first one of the remote transaction processing nodes. The system also typically comprises an application process, wherein the application process receives a work request associated with a remote transaction from one of the first remote transaction processing node and a second remote transaction processing node, wherein the remote transaction is subordinate to the local transaction, wherein the work request includes a first global transaction identifier (G1) associated with the local transaction, and wherein G1 encodes the first TXID, wherein the application process determines whether G1 is associated with a transaction created by the TM; and if so the application process decodes a portion of G1 so as to obtain the first transaction identifier (TXID).

According to yet another aspect of the invention, a transaction processing system is provided, which is communicably coupled to one or more remote transaction processing nodes. The system typically comprises a transaction manager (TM) and an application process that performs work for a local transaction, wherein the TM creates the local transaction which has an associated first transaction identifier (TXID), and wherein the local transaction is exported to a first one of the remote transaction processing nodes. The system also typically includes a first gateway process, wherein the first gateway process receives a push request associated with a remote transaction from one of the first remote transaction processing node and a second remote transaction processing node, wherein the remote transaction is subordinate to the local transaction, wherein the push request includes a first global transaction identifier (G1) associated with the local transaction, and wherein G1 encodes the first TXID, wherein the first gateway process determines whether G1 is associated with a transaction created by the TM; and if so the first gateway process decodes a portion of G1 so as to obtain the first TXID.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
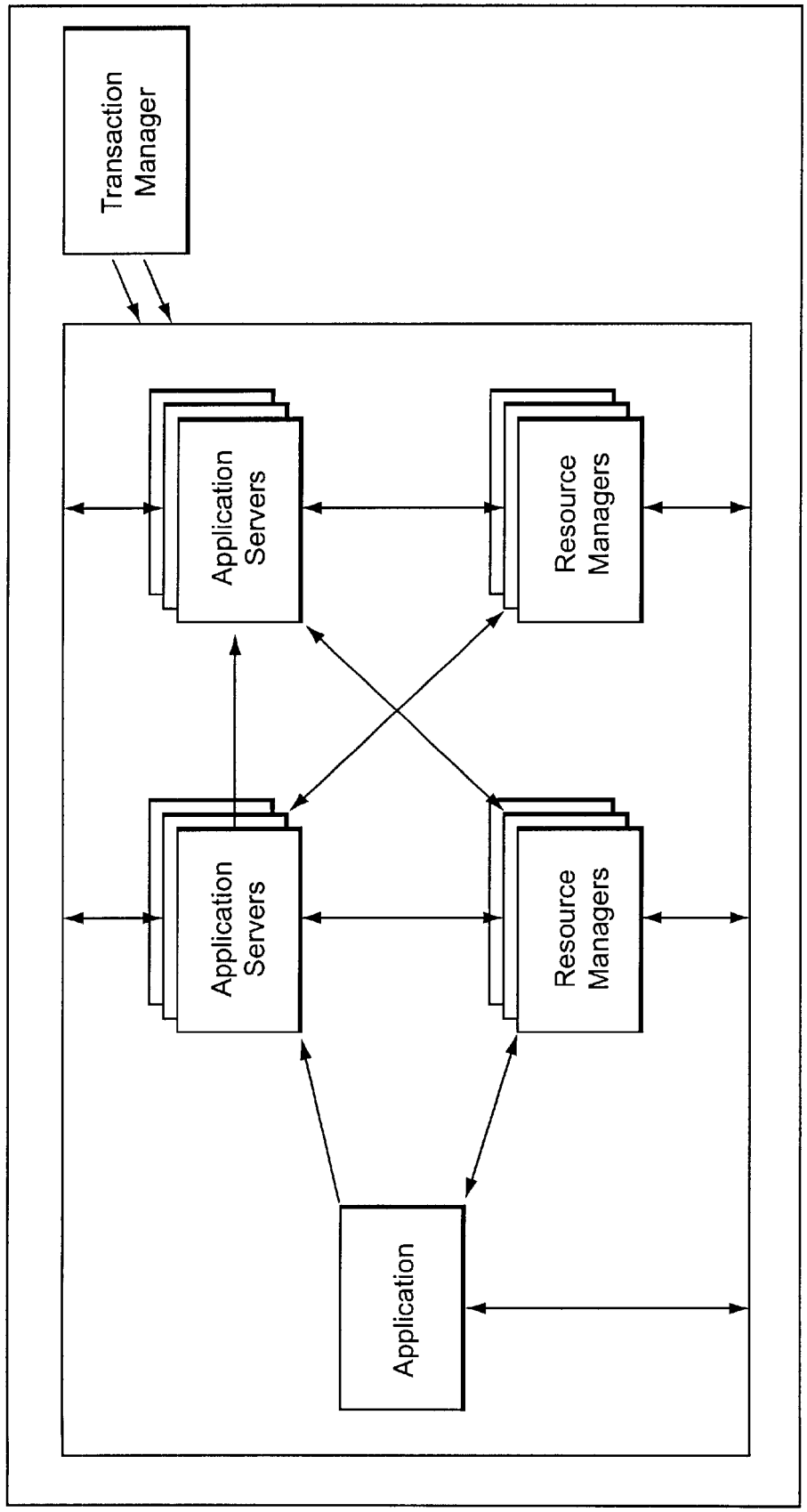
FIG. 1 is a block diagram that illustrates a typical call structure of an application invoking various resource managers and application services to execute a transaction that is spread among application programs (clients and servers) and resource managers.

FIG. 1 illustrates a typical call structure of an application process that is invoking various resource managers and application services to execute a transaction that is spread among application programs (clients and servers) and resource managers according to the present invention. Transaction processing occurs in both centralized (local) systems and in distributed systems. The services and resource managers are invoked using local and/or remote procedure calls accordingly. Remote services and servers run in separate processes, such as on a remote computer system, while local services and servers run in the local computer system. In a localized transaction processing system, an application process accesses services by calling one or more local resource managers using a transactional procedure call. In a distributed transaction processing system, an application process accesses both local and remote services by calling one or more local resource managers, and/or one or more remote resource managers located at one or more remote processing nodes, or domains, using a transactional remote procedure call.

When an application process subcontracts part of a transaction to a foreign transaction management system it is commonly referred to as exporting a transaction branch. One or more transaction branches can be exported for a given transaction to one or more foreign transaction management systems. Similarly, a foreign transaction management system can start a transaction and subcontract part of the transaction to the local transaction management system. This is commonly referred to as importing a transaction branch.

Figure 2:
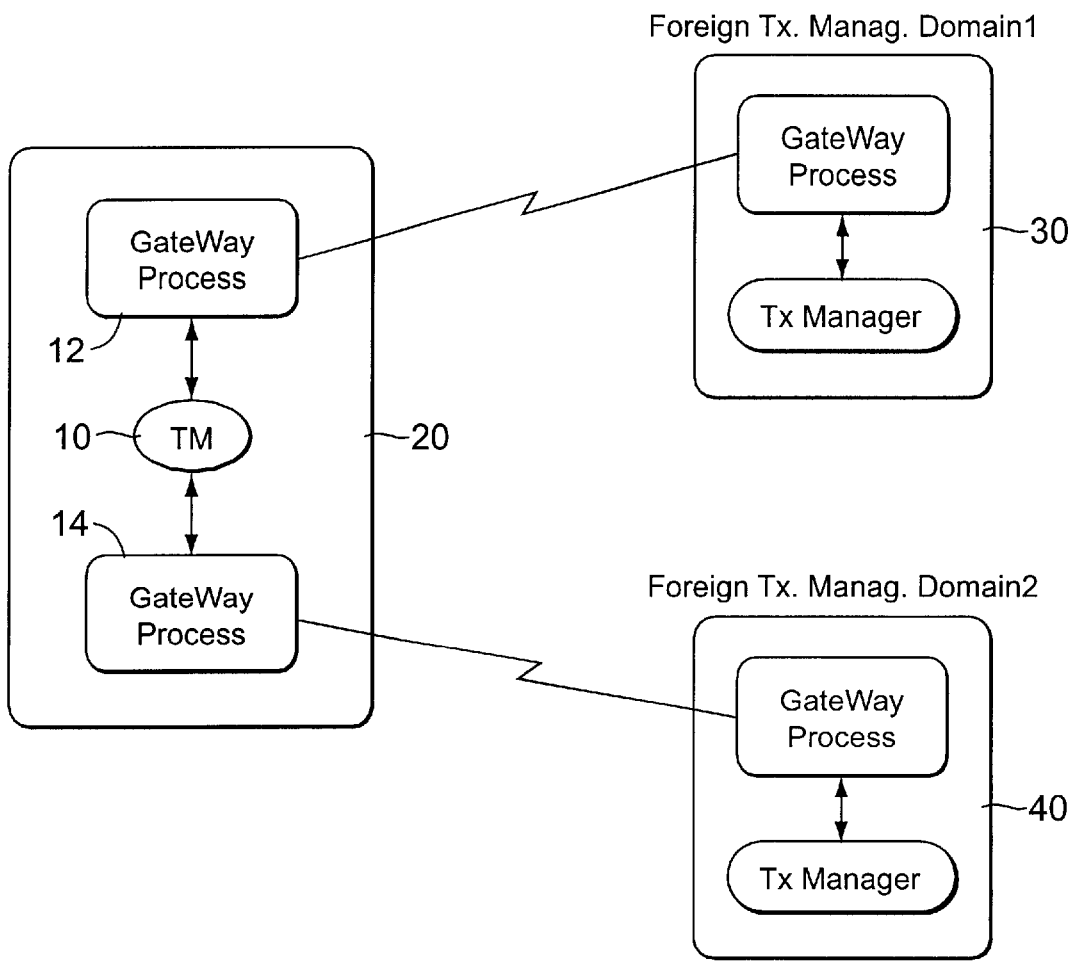
FIG. 2 is a block diagram that illustrates the basic components of a heterogeneous transaction processing system according to the present invention.

A typical transaction management system includes one or more applications, one or more resource managers including communication resource managers, and a transaction manager. The transaction manager provides transaction management functions, such as monitoring the progress of the transaction and coordinating the commitment processing (or agreement protocol) and rollback of the transaction, and protects the integrity of user data. An application process calls transaction services in the transaction manager to begin and end transactions. As part of a transaction, an application process accesses services by calling one or more local resource managers, and invokes remote services through one or more communication resource managers. A communication resource manager (CRM) encodes the transactional semantics of a foreign transaction management system and acts as a gateway to foreign transaction management domains. A CRM interfaces between the local transaction management system and a foreign transaction management domain. The process environment in which a CRM executes is called a gateway process, or simply "gateway". The gateway exports and imports transaction branches allowing foreign transaction managers to participate in the agreement protocol with the local transaction manager. FIG. 2 illustrates the basic components of such a heterogeneous transaction processing system according to the present invention. As shown, local transaction management domain 20 includes transaction manager 10, gateway processes 12 and 14, and an application process 16. Transactions are imported and exported to and from foreign transaction management domains 30 and 40 through gateway processes 12 and 14, respectively.

Figure 3A:
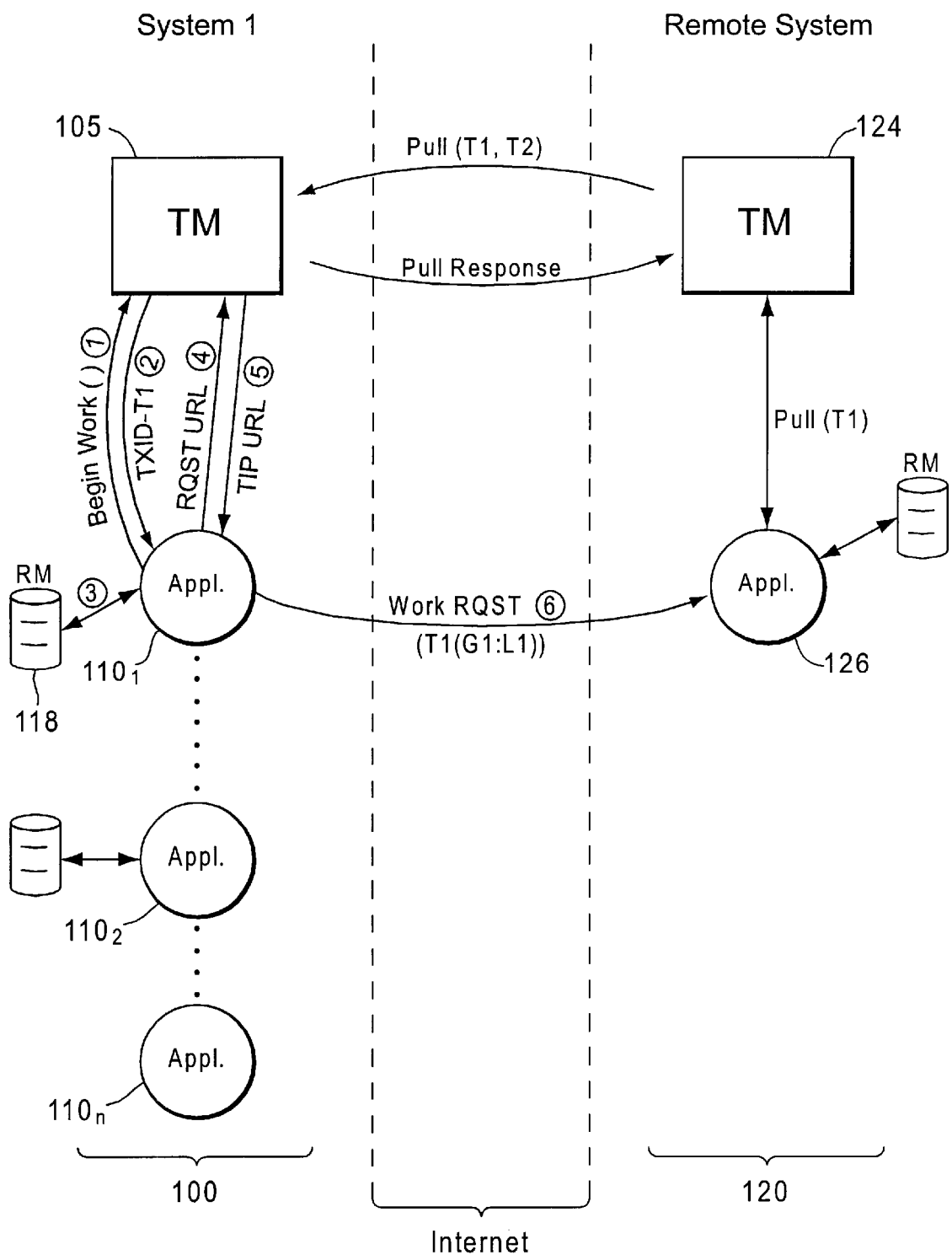
FIG. 3a illustrates the call structure associated with a parent transaction sent by the local transaction processing system via a pull request to a remote transaction processing system according to an embodiment of the present invention.
Figure 3B:
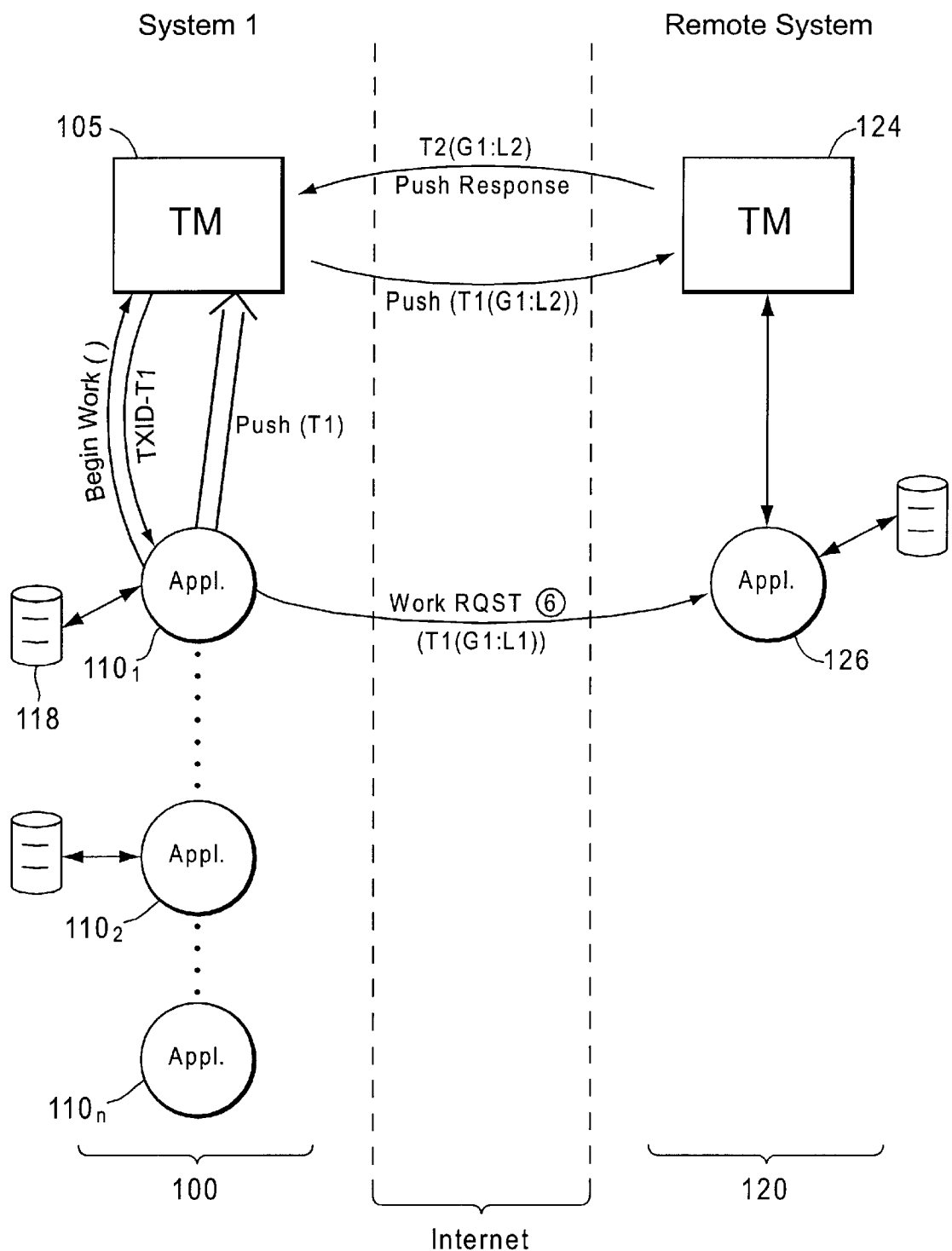
FIG. 3b illustrates the call structure associated with a parent transaction sent by the local transaction processing system via a push request to a remote transaction processing system according to an embodiment of the present invention.

FIGS. 3a and 3b illustrate the call structures associated with a parent transaction sent by local transaction processing system 100 to remote system 120 according to an embodiment of the present invention. Transaction processing system 100 includes a transaction manager 105, one or more application processes $110_1$–$110_n$, where n is the number of application processes, and at least one gateway process (not shown). Application process $110_1$ initiates a transaction by calling transaction services in transaction manager 105, for example, by issuing a Begin_Work( ) request to transaction manager 105, thereby registering with transaction manager 105. Transaction manager 105 begins a transaction, T1, creates a unique transaction identifier (TXID), TXID-T1, which is used to identify that particular transaction, and responds to application process $110_1$ with the transaction identifier, TXID-T1. Once application process $110_1$ has started the transaction (the transaction has been registered with transaction manager 105), it invokes resource managers by sending work requests to remote (foreign) services and local services such as resource manager 118, which is coupled to a service or resource, such as a database. Application process $110_1$ interacts with transaction manager 105 and a gateway process to export transaction branches to foreign transaction management systems, such as second transaction system 120.

When application process $110_1$ desires to export a transaction branch to a remote transaction processing system, application $110_1$ requests from transaction manager 105 an identification of the transaction to be exported, including identification of the owner of that transaction (i.e., local transaction management domain 100) in the form of a TIP uniform resource locator (URL). In preferred aspects, the TIP URL for transaction T1 includes a global transaction identifier, G1, and a local transaction identifier, L1. The global transaction identifier, such as G1, preferably encodes the transaction identifier TXID and information related to the particular transaction, and the local transaction identifier, such as L1, also preferably includes the transaction identifier TXID of the transaction started locally (e.g., TXID-T1). In this embodiment, for the present example, the TIP URL preferably takes on the form of: tip://<endpoint>/<G1:L1>, where the <endpoint>includes the internet address of the system that created the TIP URL, in this case transaction processing system 100. In more preferred aspects, the global transaction identifier G1 encodes both a unique identifier and the transaction identifier TXID so as to uniquely identify the transaction.

Application $110_1$ establishes an internet connection with remote transaction system 120 and transfers a work request to remote system 120. The work request includes a work instruction and the TIP URL, denoted T1(G1:L1) in FIGS. 3a and 3b. At the same time application $110_1$ may initiate work on its own system by issuing a work request to local resource manager 118. When the work request is received by remote system 120, remote system 120 creates a local subordinate transaction, T2, on behalf of transaction T1.

If the work request is issued as is shown in FIG. 3a, the resource manager or application process that receives the work request at remote transaction processing system 120 passes it with an appropriate call (i.e., pull call) to remote transaction manager 124. Remote transaction manager 124, in response, creates a local transaction identified by a transaction identifier, e.g., TXID-T2, under which work at remote node 120 will be tracked, and responds to transaction manager 105 with a pull request. Transaction manager 105 issues a pull response to remote transaction manager 124. Remote transaction manager 124 also creates a control block data structure where it stores information about the local transaction, T2, including its association with transaction T1. Transaction manager 105 does the same so that it knows to include the remote system's transaction manager in the 2PC protocol.

If the work request is issued as is shown in FIG. 3b, remote transaction manager 124 retrieves the TIP URL and creates a local transaction identified by a transaction identifier, e.g., TXID-T2, under which work at remote node 120 will be tracked. Remote transaction manager 124 also responds to transaction manager 105 with a push response and creates a control block data structure where it stores information about the local transaction, T2 including its association with transaction T1. Transaction manager 105 also creates a control block data structure so that it knows to include the remote system's transaction manager in the 2PC protocol.

In the course of performing work for transaction T2, it may be necessary for transaction processing system 120 to export a transaction branch to another remote transaction processing system or back to transaction processing system 100. For example, application process 126 while performing work for T2 may desire to send a work request back to an application process on transaction processing system 100. Accordingly, application 126 requests from transaction manager 124 a TIP URL identifying transaction T2. Remote transaction manager 124 reads TXID-T2 and knows that transaction T2 is an imported transaction branch subordinate to T1 (e.g., by checking its data structures), and retrieves the global transaction identifier of the parent transaction associated with transaction T2, namely G1. For example, copending application Ser. No. 09/267,844, filed concurrently with the present application, the contents of which are incorporated by reference for all purposes, discloses techniques for identifying whether a transaction is imported and for finding the global transaction identifier associated therewith. When creating the TIP URL for transaction T2, remote transaction manager 124 includes global transaction identifier G1 of the parent transaction T1 and local transaction identifier L2 of the local subordinate transaction T2 as follows: tip://<endpoint>/<G1:L2>.

Figure 4A:
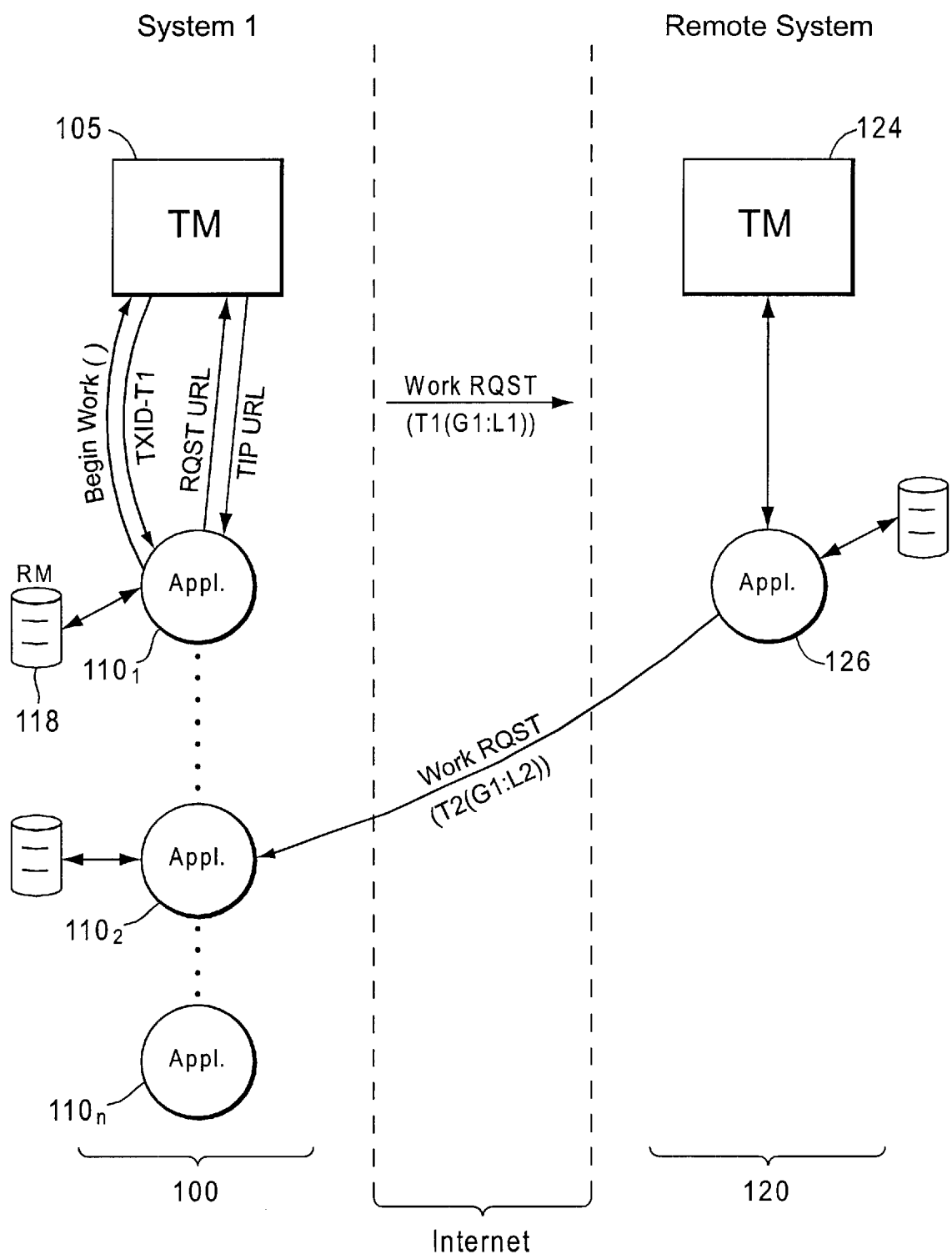
FIG. 4a illustrates the call structure associated with a looped-back transaction received by the local transaction processing system via a pull request sent from a remote transaction processing system according to an embodiment of the present invention.
Figure 4B:
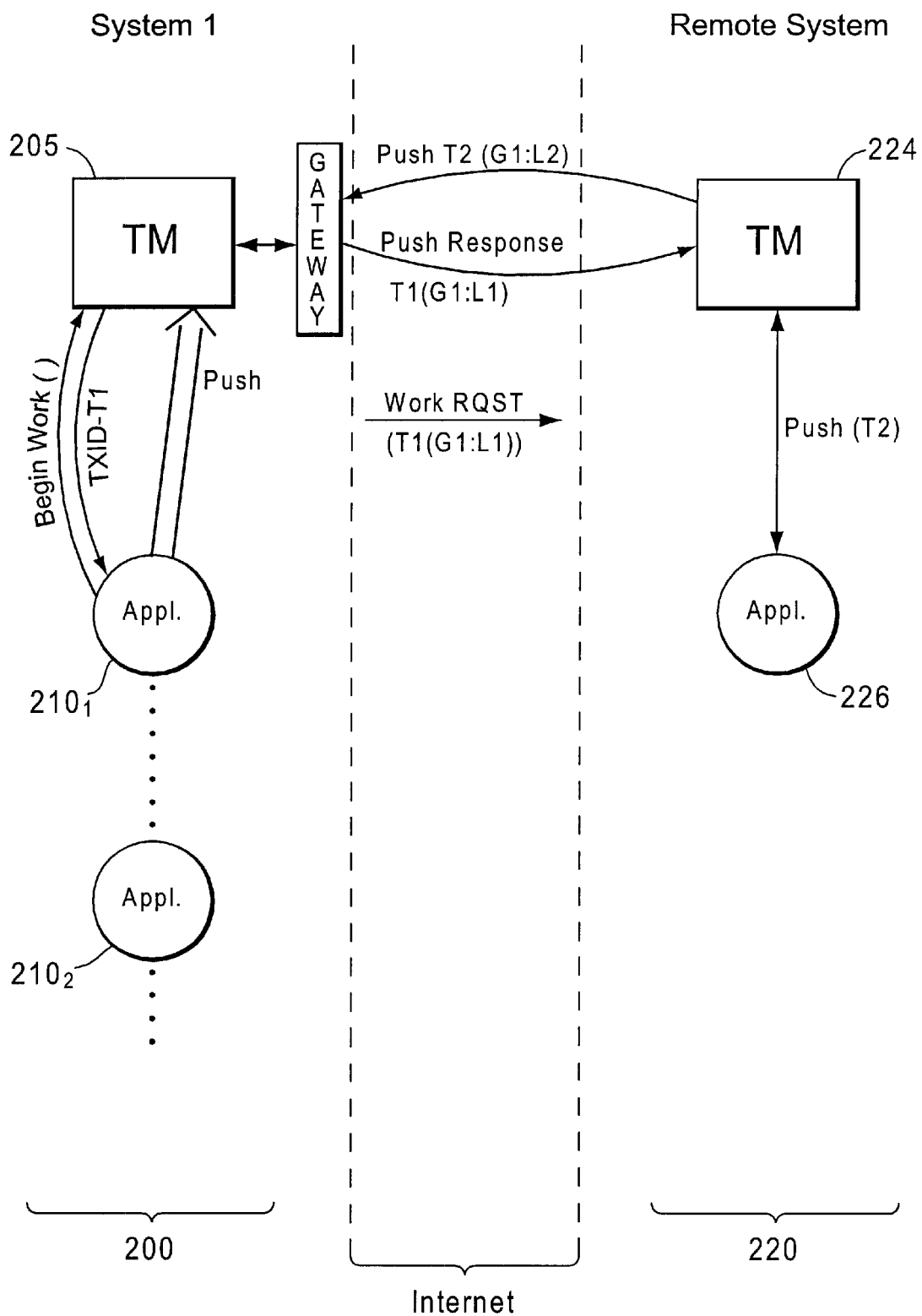
FIG. 4b illustrates the call structure associated with a looped-back transaction received by the local transaction processing system via a push request sent from a remote transaction processing system according to an embodiment of the present invention.

FIGS. 4a and 4b illustrate the call structures associated with a looped-back transaction received by local transaction processing system 100 from remote system 120 according to an embodiment of the present invention. In one embodiment, as shown in FIG. 4a, a work request sent from remote transaction processing system 120 to first transaction processing system 100. In this embodiment, application process 126 sends the work request directly to the desired application process or resource manager on transaction processing system 100. As shown in FIG. 4a, the work request is sent to second application process $110_2$. The work request, however, may be sent back to first application process $110_1$, which initiated the parent transaction T1, or to any other application process on transaction processing system 100 as desired by application process 126.

Application process $110_2$ (as well as all application on transaction processing system 100) is configured with the necessary algorithms and information to interpret the TIP URL included with the work request. For example, in one embodiment, application process $110_2$ includes a library that is configured with the necessary algorithms and information to interpret the TIP URL. When the work request is received by application process $110_2$, application process $110_2$ reads the endpoint identifier and determines whether the endpoint identifier identifies an endpoint of the transaction processing system 100. Alternatively, application process $110_2$ decodes a portion of the global transaction identifier included in the TIP URL, in this case G1, to determine the unique identifier encoded in G1. In one embodiment, application process $110_2$ is configured with a table listing the known endpoint identifiers for local transaction processing system 100. Additionally, or alternatively, the table includes a listing of unique identifiers associated with local transaction processing system 100.

If one of the local endpoints is identified or a unique identifier is identified, e.g., via a look-up in the table, then application process $110_2$ knows that the work request is associated with a transaction that was started locally on transaction processing system 100. Application process $110_2$ then decodes a portion of the global transaction identifier to obtain the transaction identifier encoded therein. In the present example, application process $110_2$ decodes a portion of G1 to obtain the transaction identifier TXID-T1. Application process $110_2$ performs the work requested in the received work request under transaction T1. In this manner, work is performed for the remote, subordinate transaction T2 under its parent transaction T1 so that a new transaction does not need to be initiated. Also work is initiated by application process $110_2$ under parent transaction T1 without first communicating with transaction manager 105 to determine whether remote transaction T2 is associated with a local parent transaction such as T1.

If one of the local endpoints is not identified, application process $110_2$ knows that transaction T2 is not associated with a parent transaction initiated locally. Accordingly, application process $110_2$ communicates with transaction manager 105 and a new (subordinate) transaction is created under which work will be performed on behalf of (parent) transaction T2 by application process $110_2$. Transaction manager 105 responds to remote transaction manager 124 with a message indicating that it will do the work, and that a new transaction has been started locally for the transaction identified by the global transaction identifier included in the work request. In this manner, transaction processing system 120 knows to include transaction processing system 100 as a subordinate in the 2PC protocol with regard to transaction T2.

In an alternate embodiment, as shown in FIG. 4b, the work request sent from remote transaction processing system 120 to first transaction processing system 100 is in the form of a push request. In this embodiment, the push request is sent to transaction manager 105 through gateway process 115. Gateway 115 is configured with the necessary algorithms and information to interpret the TIP URL included with the push request. For example, in one embodiment, gateway 115 includes a library that is configured with the necessary algorithms and information to interpret the TIP URL. When the push request is received by gateway 115, gateway 115 reads the endpoint identifier and determines whether the endpoint identifier identifies an endpoint of the transaction processing system 100. Alternatively, gateway 115 decodes a portion of the global transaction identifier included in the TIP URL to determine the unique identifier encoded therein. In one embodiment, gateway 115 is configured with a table listing the known endpoint identifiers for local transaction processing system 100.

If one of the local endpoints is identified, then gateway 115 knows that the work request is associated with a transaction that was started locally on transaction processing system 100. Gateway 115 then decodes a portion of the global transaction identifier to obtain the transaction identifier encoded therein. In the present example, gateway 115 decodes a portion of G1 to obtain the transaction identifier TXID-T1. Gateway 115 forwards transaction T1 to the remote system 220. In this manner, work is performed for the remote, subordinate transaction T2 under its parent transaction T1 so that a new transaction does not need to be initiated.

If one of the local endpoints is not identified, gateway 115 knows that transaction T2 is not associated with a parent transaction initiated locally. Accordingly, gateway 115 communicates with transaction manager 105 and a new (subordinate) transaction is created under which work will be performed on behalf of (parent) transaction T2 by a resource or an application process, such as application process 110₂. Transaction manager 105 responds to remote transaction manager 124 that a new transaction has been started locally for the transaction identified by the global transaction identifier included in the push request. In this manner, transaction processing system 120 knows to include transaction processing system 100 as a subordinate in the 2PC protocol with regard to transaction T2.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, it will be apparent to one of skill in the art that a loop-back transaction can be received from a third transaction processing system, wherein second transaction processing system exports a transaction branch associated with transaction T2 (subordinate to transaction T1) to the third transaction processing system and the third transaction processing system thereafter exports a transaction branch subordinate to transaction T2 (and therefore also subordinate to transaction T1) to transaction processing system 100. Therefore, the scope of the appended claims should be accorded the broadest interpretation so as to encompass all such modifications and similar arrangements.

What is claimed is:

1. A method for processing exported transactions, including looped-back transactions, in a transaction processing system having a transaction manager and an application process, the method comprising the steps of:

initiating a local transaction in the transaction processing system by the transaction manager in response to a request by the application process, the local transaction being assigned a local transaction identifier;

sending a first work request associated with the local transaction to a remote transaction processing node, the first work request including a global transaction identifier associated with the local transaction and having the local transaction identifier encoded therein;

receiving a second work request, associated with a remote transaction, from the remote transaction processing node, the second work request including the global transaction identifier;

determining from the global transaction identifier whether the second work request is associated with any transaction that was started locally on the transaction processing system;

if the second work request is associated with any transaction that was started locally on the transaction processing system, decoding a portion of the global transaction identifier to obtain a local transaction identifier encoded therein; and if the obtained local transaction identifier identifies the local transaction initiated by the application process, performing the second work request under the local transaction.

2. A method for processing exported transactions as recited in claim 1, further comprising the steps, if the second work request is not associated with a transaction that was started locally on the transaction processing system:

initiating a transaction on the local transaction processing system that is subordinate to the transaction identified in the second work request; and responding to the remote transaction manager with a message indicating that the local transaction processing system has initiated a transaction locally on behalf of the transaction identified in the second work request.

3. A method for processing exported transactions as recited in claim 1, further comprising the steps of, subsequent to initiating the local transaction and prior to sending a first work request:

sending a push request to the remote transaction processing node to initiate a subordinate transaction to the local transaction on the remote transaction processing node;

receiving a push response from the remote transaction processing node, the push response including the identifier of the subordinate remote transaction; and updating a global map by associating the global transaction identifier with the subordinate remote transaction identifier.

4. A method for processing exported transactions as recited in claim 1, further comprising the steps of, subsequent to sending a first work request and prior to receiving a second work request:

receiving a pull request from the remote transaction processing node, the pull request including an identifier of the transaction initiated on the remote processing node in response to the first work request, the transaction on the remote processing node being subordinate to the local transaction;

sending a pull response to the remote transaction processing node; and updating a global map by associating the global transaction identifier with the subordinate remote transaction identifier.

5. A method for processing exported transactions as recited in claim 1,
wherein the second work request is a push request; and
wherein the step of receiving the second work request is performed by a gateway process.

6. A method for processing exported transactions as recited in claim 1,
wherein the second work request includes a TIP URL that includes an endpoint identifier; and
further comprising the step of obtaining the endpoint identifier in the TIP URL.

7. A method for processing exported transactions as recited in claim 6,
wherein the second work request is a push request;
wherein the step of receiving the second work request is performed by a gateway process; and
wherein obtaining the endpoint identifier is performed by the gateway process.

8. A method for processing exported transactions as recited in claim 6, wherein the step of determining from the global transaction identifier whether the second work request is associated with any transaction that was started locally on the transaction processing system includes identifying the endpoint identifier by performing a table look up, the table including known endpoint identifiers for the transaction processing system.

9. A method for processing exported transactions as recited in claim 8,
wherein the second work request is a push request;
wherein the step of receiving the second work request is performed by a gateway process; and
wherein identifying the endpoint identifier is performed by the gateway process.

10. A method for processing exported transactions as recited in claim 1,
wherein the second work request includes a TIP URL that includes a global transaction identifier having a unique identifier encoded therein; and
further comprising the step of decoding a portion of the global transaction identifier to determine the unique identifier encoded therein.

11. A method for processing exported transactions as recited in claims 10,
wherein the second work request is a push request;
wherein the step of receiving the second work request is performed by a gateway process; and
wherein decoding the portion of the global transaction identifier is performed by the gateway process.

12. A method for processing exported transactions as recited in claim 10, wherein the step of determining from the global transaction identifier whether the second work request is associated with any transaction that was started locally on the transaction processing system includes identifying the unique identifier by performing a table look up.

13. A method for processing exported transactions as recited in claim 12,
wherein the second work request is a push request;
wherein the step of receiving the second work request is performed by a gateway process; and
wherein identifying the unique identifier is performed by the gateway process.

14. A transaction processing system communicably coupled to one or more remote transaction processing nodes, the system comprising:

a processing unit that includes a central processor and a memory, the central processor being connected to the memory to receive program instructions therefrom, the memory configured to contain a transaction manager and an application process operative, when executed by the central processor, to:
initiate a local transaction in the transaction processing system by the transaction manager in response to a request by the application process, the local transaction being assigned a local transaction identifier;
send a first work request associated with the local transaction to a remote transaction processing node, the first work request including a global transaction identifier associated with the local transaction and having the local transaction identifier encoded therein;
receive a second work request, associated with a remote transaction, from the remote transaction processing node, the second work request including the global transaction identifier;
determine from the global transaction identifier whether the second work request is associated with any transaction that was started locally on the transaction processing system;
decode a portion of the global transaction identifier to obtain the local transaction identifier encoded therein, if the second work request is associated with any transaction that was started locally on the transaction processing system; and
perform the second work request under the local transaction, if the obtained local transaction identifier identifies the local transaction initiated by the application process.

15. A transaction processing system as recited in claim 14,
wherein the second work request is a push request;
further comprising a gateway process residing in the memory, the gateway process being operative to receive the second work request and to convey the second work request to the transaction manager.

16. A transaction processing system as recited in claim 15,
wherein the second work request includes a TIP URL with an endpoint identifier; and
further comprising a gateway process residing in the memory, the gateway process being operative to receive the second work request and to obtain the endpoint identifier in the TIP URL.

17. A transaction processing system as recited in claim 16, the gateway process being further operative to determine from the global transaction identifier whether the second work request is associated with any transaction that was started locally on the transaction processing system.

18. A transaction processing system as recited in claim 15,
wherein the second work request includes a TIP URL with a global transaction identifier and a unique identifier encoded therein; and
further comprising a gateway process residing in the memory, the gateway process being operative to receive the second work request and to obtain the unique identifier from the global transaction identifier in the TIP URL.

19. A transaction processing system as recited in claim 18, the gateway process being further operative to determine from the global transaction identifier whether the second work request is associated with any transaction that was started locally on the transaction processing system.

20. A computer readable medium containing a program for operating a transaction processing system communicably coupled to one or more remote transaction processing nodes, the program comprising the steps of:

initiating a local transaction in the transaction processing system by the transaction manager in response to a request by the application process, the local transaction being assigned a local transaction identifier;

sending a first work request associated with the local transaction to a remote transaction processing node, the first work request including a global transaction identifier associated with the local transaction and having the local transaction identifier encoded therein;

receiving a second work request, associated with a remote transaction, from the remote transaction processing node, the second work request including the global transaction identifier;

determining from the global transaction identifier whether the second work request is associated with any transaction that was started locally on the transaction processing system;

if the second work request is associated with any transaction that was started locally on the transaction processing system, decoding a portion of the global transaction identifier to obtain the local transaction identifier encoded therein; and if the obtained local transaction identifier identifies the local transaction initiated by the application process, performing the second work request under the local transaction.

\* \* \* \* \*

UNITED STATES PATENT AND TRADEMARK OFFICE
CERTIFICATE OF CORRECTION

PATENT NO. : 6,496,825 B1
DATED : December 17, 2002
INVENTOR(S) : Johannes Klein et al.

It is certified that error appears in the above-identified patent and that said Letters Patent is hereby corrected as shown below:

Title page,
Item [56], References Cited, U.S. PATENT DOCUMENTS, please add:

```
-- 5,319,774    6/1994   Ainsworth et al.............395/575
   5,327,532    7/1994   Ainsworth et al.............395/200
   5,504,899    4/1996   Raz.........................395/600
   5,504,900    4/1996   Raz.........................395/650
   5,680,610   10/1997   Smith et al.................395/610
   5,701,480   12/1997   Raz.........................395/671
   5,835,766   11/1998   Iba et al...................395/679
   5,920,863    7/1999   McKeehan et al.............707/10
   5,923,833    7/1999   Freund et al................395/182.17
   5,926,463    7/1999   Ahearn et al................370/254
   6,101,527    8/2000   Lejeune et al...............709/201
   6,115,711    9/2000   White.......................707/10
   6,173,313B1  1/2001   Klots et al.................709/203
   6,205,464B1  3/2001   Cobb et al..................709/101
   6,209,038B1  3/2001   Bowen et al.................709/238 --
```

Column 2,
Line 21, "neering Task Force (IETF). Attached hereto, as Appendix A." should read
-- neering Task Force (IETF). Incorporated by reference into the present application --.

Column 3,
Line 40, "initiated by the local transaction processing system (i.g., a" should read
-- initiated by the local transaction processing system (e.g., a --.

Column 4,
Line 30, "ing node and a second remote transaction processing node," should read
-- ing nodes and a second remote transaction processing node, --;
Line 50, "first remote transaction processing node and a second remote" should read
-- first remote transaction processing nodes and a second remote --.

Column 8,
Line 17, "Application process 110$_2$ (as well as all application on" should read
-- Application process 110$_2$ (as well as all applications on --.

UNITED STATES PATENT AND TRADEMARK OFFICE
CERTIFICATE OF CORRECTION

PATENT NO. : 6,496,825 B1
DATED : December 17, 2002
INVENTOR(S) : Johannes Klein et al.

It is certified that error appears in the above-identified patent and that said Letters Patent is hereby corrected as shown below:

Column 9,
Line 3, "tem 120 to first transaction processing system 100 is in the" should read
-- tem 220 to first transaction processing system 200 is in the --;
Line 5, "is sent to transaction manager 105 through gateway process" should read
-- is sent to transaction manager 205 through gateway process --;
Line 13, "transaction processing system 100. Alternatively, gateway" should read
-- transaction processing system 200. Alternatively, gateway --;
Line 18, "local transaction processing system 100" should read
-- local transaction processing system 200 --;
Line 22, "system 100. Gateway 115 then decodes a portion of the" should read
-- system 200. Gateway 115 then decodes a portion of the --;
Line 34, "municates with transaction manager 105 and a new" should read
-- municates with transaction manager 205 and a new --;
Line 38, "process $110_2$. Transaction manager 105 responds to remote" should read
-- process $210_2$. Transaction manager 205 responds to remote --;
Line 39, "transaction manager 124 that a new transaction has been" should read
-- transaction manager 224 that a new transaction has been --;
Line 42, "manner, transaction processing system 120 knows to include" should read
-- manner, transaction processing system 120 knows to include --;
Line 43, "transaction processing system 100 as a subordinate in the" should read
-- transaction processing system 100 as a subordinate in the --.

Signed and Sealed this

Twenty-second Day of July, 2003

JAMES E. ROGAN
*Director of the United States Patent and Trademark Office*